Dec. 7, 1965      J. T. MacDOWELL      3,222,299
PROCESS OF RECLAIMING LINEAR TEREPHTHALATE POLYESTER
Filed Oct. 16, 1961
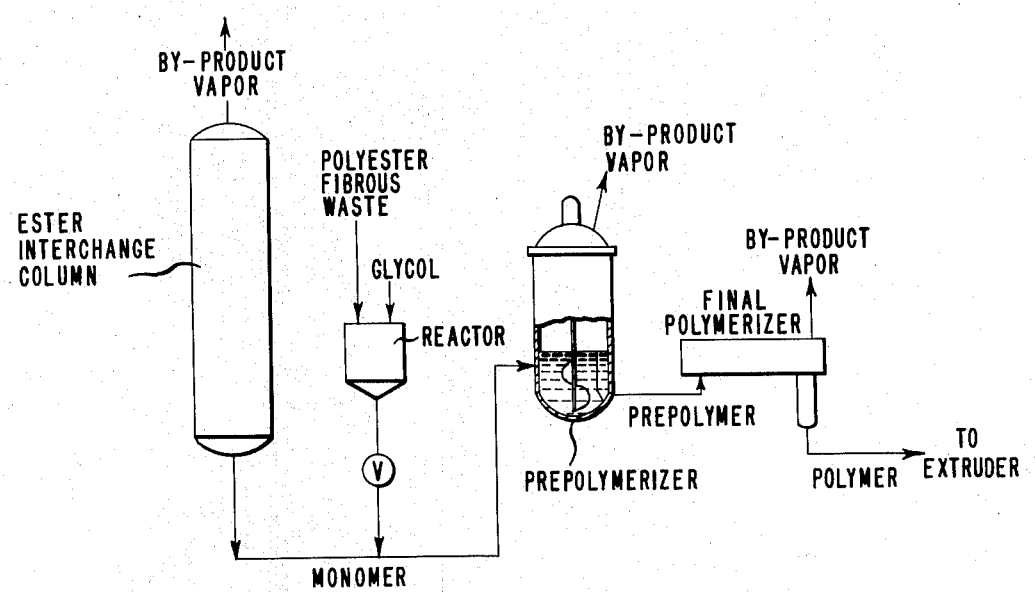
INVENTOR
JOHN T. MacDOWELL
BY
ATTORNEY United States Patent Office 3,222,299
Patented Dec. 7, 1965

3,222,299
PROCESS OF RECLAIMING LINEAR
TEREPHTHALATE POLYESTER
John T. MacDowell, Kinston, N.C., assignor to E. I. du Pont de Nemours and Company, Wilmington, Del., a corporation of Delaware
Filed Oct. 16, 1961, Ser. No. 145,239
7 Claims. (Cl. 260—2.3)

This invention relates to polymerization processes and more particularly to improvements in the continuous production of linear terephthalate polyesters utilizing reprocessed waste polymer.

Terephthalate polyesters such as those disclosed in U.S. 2,465,319 have become valuable articles of commerce and are produced in large quantities. In the manufacture of terephthalate polyester articles such as fibers and films, it is inevitable that a certain amount of waste polymer is produced as a byproduct of the process. In the manufacture of fibers, for instance, an appreciable quantity of fibrous waste results from the spinning of filaments having physical properties outside of the standardized property limits advertised for sale. Representative fiber properties are denier, break elongation, tenacity, uniformity, and the like. Waste fibrous product is also produced in the packaging process or when some piece of equipment fails to operate in the proper manner.

In attempting to reclaim this polyester waste, it has been found that the simple process of remelting the polymer and extruding it a second time does not give a satisfactory product. On the other hand, procedures requiring the complete breakdown of the polymer to the original starting materials, followed by purification of these materials and repolymerization, results in an expensive process making it uneconomical to utilize the waste polymer.

An alternative procedure for utilizing waste polymer which has enjoyed a measure of success involves the heating of the waste polymer with glycol to convert the polymer into monomer, i.e., the diglycol terephthalate, and then injecting the monomer, without further purification, in relatively small arounts into fresh monomer being fed to a continuous polymerization system. The mixture of the reclaimed monomer and fresh monomer are polymerized in the usual fashion, and extruded into satisfactory fibers, films, or other shaped structures. Using this system, however, it has been found that, for reasons not understood, the amount of reclaimed monomer injected into the polymerization system must be kept below a level of about 20% of the total monomer if the polymer produced is to have satisfactory properties. When amounts of recovered monomer higher than about 20% are injected, it is found that the rate of polymerization of the mixture is reduced to such an extent that the output of the equipment must be cut back to a prohibitively low level. Further, it has been found that the addition of increased amounts of catalyst does not alleviate this condition.

It might be assumed that the rate of polymerization could be increased by further reducing the pressure on the polymerization vessel and raising the temperature. However, it has been found that a significant increase in temperature above that normally used results in an increase in polymer color, thus making the product unacceptable for sale. With respect to pressure, it is generally true that polymerization vessels for polyesters are designed to operate at a particular pressure, e.g., about 1–3 mm. of mercury, and any requirement for an appreciable reduction in this pressure means that new equipment of a more expensive design must be fabricated to achieve such a result.

It is an object of this invention to provide an improved process for utilizing monomer prepared from reclaimed polyester waste. Another object is the provision of a method for improving the polymerizability of bis-2-hydroxyethyl terephthalate derived from reclaimed terephthalate polyesters. Further objects will be apparent from the following description of the invention.

It has now been found that in a polymerization process in which a diglycol ester of terephthalic acid is fed to a reaction vessel and there polymerized under conditions of reduced pressure and elevated temperature, and in which at least a part of the diglycol ester is derived from a reclaimed terephthalate polyester, the operability and efficiency of the process is greatly enhanced by the presence in the polymerization mixture of a metal salt of a sulfonated aromatic ester-forming compound.

Therefore, the objects of this invention are accomplished by a process comprising mixing scrap linear terephthalate polyester with a glycol and heating the mixture until the polymer is converted for the most part to the diglycol terephthalate ester, mixing this diglycol terephthalate ester from reclaimed polymer with an appreciable quantity of diglycol terephthalate ester prepared from purified starting materials, and thereafter polymerizing the mixture under conditions of reduced pressure and elevated temperature to produce a fiber or film-forming linear terephthalate polyester, characterized by the presence in the polymerization mixture of a minor amount of a metal salt of an aromatic ester forming compound having the formula:

where M is an alkali or alkaline earth metal; Z is an arylene radical; X is a member of the class consisting of

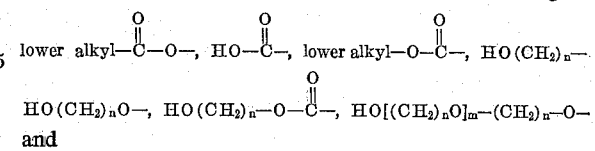

and

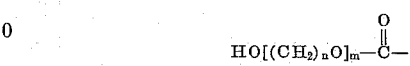

$n$ and $m$ are integers with $n$ being greater than 1; and Y is a member of the class consisting of X and hydrogen. Alkyl groups of up to about 5 C atoms are considered "lower."

The figure is a flow sheet illustrating schematically a preferred embodiment of the process of this invention.

Aromatic sulfonate compounds suitable for use in the process of this invention are fully described in British Patent 868,496. Alkali metal salts such as those of sodium and potassium are especially preferred. Suitable compounds include potassium 3,5-dicarbomethoxybenzenesulfonate, potassium 2,5-bis(hydroxyethoxy)benzenesulfonate, lithium 2-carbo-beta-hydroxyethoxy-5-hydroxyethoxybenzenesulfonate, and the like.

The improved results observed in the process of this invention are especially surprising in view of the known fact that organic sulfonate salts do not act as catalysts for the polymerization of diglycol esters of terephthalic acid.

The aromatic sulfonate salts which are effective in giving the improved process of this invention may be introduced to the reaction mixture by adding compounds such as sodium 3,5-dicarbomethoxybenzenesulfonate to the ingredients used to prepare the fresh monomer. Alternatively, aromatic sulfonate salt groups may be introduced by using polyester waste containing aromatic sulfonate salt units in the polymer molecule.

The concentration of aromatic sulfonate salt groups necessary for the improved polymerization process of this invention depends somewhat upon the percentage of monomer derived from reclaimed polymer waste. Generally speaking, at least about 0.02 mol percent aromatic sulfonate salt units are necessary to obtain an appreciable improvement in the polymerization process. It is preferred that concentrations above about 0.07 mol percent be used. With respect to the upper concentration limit, it has been found that a concentration of aromatic sulfonate salt units above about 0.15 mol percent do not offer an additional improvement in the polymerization process. On the other hand, higher concentrations are not deleterious and concentrations as high as 1 or 2 mol percent or more may be used if desired, all mol percentages being based on the terephthalate ester units.

The improvement of the present process is not restricted to the use of any particular type of processing apparatus. In general, the process may be tied in with some continuous source of monomer, the polymerization vessel having a capacity for withdrawing considerable quantities of vaporous by-products from the polymerizing monomer to form a prepolymer, and a vessel for effecting final polymerization of the prepolymer to form a high molecular weight or more viscous polymer. A suitable source of fresh monomer is an ester exchange column where glycol is reacted with dimethyl terephthalate in the presence of suitable catalysts as described in detail in U.S. 2,829,153 to Vodonik. The Vodonik apparatus and process may, of course, be replaced with any suitable continuous source of monomer. The conversion of monomer to prepolymer may be carried out in any suitable vessel, or series of vessels, fitted with a stirrer, means of heating, and means for removal of gaseous byproducts. In some instances, it may be desirable to use a prepolymerization column such as that described in U.S. 2,727,882 to Vodonik. Types of final polymerization vessels useful for the purposes of this invention are described in U.S. 2,869,838 to Ryder and U.S. 2,758,915 to Vodonik. Both patents disclose cylindrical vessels fitted with stirring means to generate large amounts of polymer surface area to facilitate removal of excess glycol from the polymerization mixture.

Normally the monomer is converted to prepolymer having an intrinsic viscosity within the range from about 0.1 to 0.3. The prepolymer is continuously fed into the final polymerization apparatus, and the intrinsic viscosity of the liquid polymer flowing through the compartments of the vessel increases as it proceeds toward the outlet end of the vessel by virtue of the fact that polymerization is continuing and the vaporous glycol by-product is continuously being withdrawn. The polymer produced has an intrinsic viscosity within the range of 0.40 to 1.2.

The polyester waste or scrap to be reclaimed is normally mixed with the desired amount of glycol and heated to the boiling point of the glycol under atmospheric pressure until the polymer has been depolymerized to the diglycol ester of terephthalic acid. Alternatively, the mixture may be heated under superatmospheric pressure if faster reaction rates are desired. Generally, it is preferred to use an amount of glycol calculated to give a molar ratio of glycol to terephthalate radicals in the range 1.9:1 to 2.1:1. In accordance with this invention, the monomer produced may then be fed into a polymerization process, along with fresh monomer, in concentrations as high as 45 or even 50%, in contrast to previous maximum concentrations of about 20%.

By "linear terephthalate polyester" is meant a linear polyester in which at least about 75% of the recurring structural units are units of the formula:

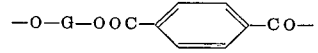

wherein —G— represents a divalent organic radical containing from 2 to 10 carbon atoms and attached to the adjacent oxygen atoms by saturated carbon atoms. Thus, the radical —G— may be of the form:

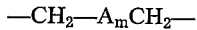

where $m$ is 0 or 1 and A represents an alkylene radical, a cycloalkylene radical, a bis-alkylene ether radical, or other suitable organic radical. The linear terephthalate polyesters may be prepared by reacting terephthalic acid or an ester-forming derivative thereof with a glycol, $G(OH)_2$, where —G— is a radical as defined above, to form the bis-glycol ester of terephthalic acid, followed by polycondensation at elevated temperature and reduced pressure with elimination of excess glycol. Examples of suitable glycols include ethylene glycol, diethylene glycol, butylene glycol, decamethylene glycol, and bis-1,4-(hydroxymethyl)cyclohexane. In a preferred embodiment of the invention, the radical —G— is the ethylene radical, —CH$_2$CH$_2$—; that is, the products are prepared from structures of poly(ethyleneterephthalate) or copolyesters thereof. In another preferred embodiment of the invention, the products are prepared from structures of poly-(p-hexahydroxylylene terephthalate) or copolyesters thereof; i.e., the polyesters comprise at least about 75% recurring structural units of the formula:

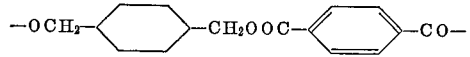

Mixtures of the glycols as defined may suitably be used to form copolyesters, or small amounts, e.g., up to about 25 mol percent, of a higher glycol may be used, such as a polyethylene glycol. Similarly, copolyesters may be formed by replacing up to about 25 mol percent of the terephthalic acid or derivative thereof with another dicarboxylic acid or ester-forming derivative thereof, such as adipic acid, dimethyl sebacate, or isophthalic acid. The preparation of such polyesters is described in U.S. 2,465,319 to Whinfield & Dickson.

The intrinsic viscosity of the polymer is used herein as a measure of the degree of polymerization of the polymer and may be defined as:

$$\text{limit } \frac{ln \eta_r}{C} \text{ as C approaches 0}$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent.

The following example will further illustrate the principles and practice of this invention. The example is to be read in connection with the accompanying drawing wherein is illustrated diagrammatically a flow sheet of a continuous polymerization process embodying the improvement of this invention.

*Example I*

(a) A continuous ester interchange reaction column is employed to react continuously ethylene glycol and dimethyl terephthalate. The column is supplied with dimethyl terephthalate at a rate of 2700 pounds per hour, ethylene glycol at a rate of 1640 pounds per hour, manganous acetate at a rate of 0.27 pound per hour, and antimony oxide at a rate of 1.2 pounds per hour. Methanol is removed from the top of the column as a byproduct, while a continuous supply of a liquid comprising bis-2-hydroxyethyl terephthalate and a low molecular weight polymer thereof having a degree of polymerization less than about 4 is removed from the bottom of the column and conducted by a heated pipeline to a second vessel for further polymerization. The temperature of the monomer mixture is then raised and the pressure on the system reduced to remove vaporous byproducts giving low molecular weight prepolymer. The liquid prepolymer having an intrinsic viscosity of about 0.2 is fed continuously into a final polymerization vessel, or "finisher," maintained at a temperature of about 275° C. and an absolute pressure of about 2 mm. of mercury. The molten polymer moves continuously through this finisher vessel for a period of about 2 hours, following which it is removed from the effluent end of the vessel and conducted continuously to a fiber spinning machine. The extruded filaments are found to have an intrinsic viscosity of about 0.6. The filaments have a very good color and are capable of being drawn into first-grade commercial fibers.

(b) 2500 pounds of poly(ethyleneterephthalate) fiber waste and 1500 pounds of ethylene glycol are introduced into a reaction vessel fitted with heating means and a reflux condenser. 7.8% by weight of the fibrous waste is composed of a copolymer of poly(ethyleneterephthalate) containing 2 mol percent sodium 3,5-dicarboxybenzenesulfonate in the polymer molecule. The mixture is heated to a temperature of about 198° C. until the polymer has been converted for the most part to bis-2-hydroxyethyl terephthalate with a minor amount of the diglycol ester of the sulfonated aromatic acid. This molten declaimed monomer is then fed continuously into the fresh monomer stream described in I(a) between the ester interchange column and the second reaction vessel, and the fresh monomer supply is cut back so that the steady state conditions previously set up in I(a) are maintained but the monomer supply to the second vessel contains approximately 45% reclaimed monomer. The concentration of diglycol ester of sodium 3,5-dicarboxybenzenesulfonate in this mixture is approximately 0.07 mol percent based upon terephthalic acid ester.

The system is operated with 45% reclaimed monomer for a period of two hours. No difficulty is experienced in obtaining an intrinsic viscosity of 0.6 and the extruded fiber has excellent color. The fiber is capable of being drawn into yarn having all physical properties within commercial first-grade limits.

(c) As a control, procedure I(b) is repeated with the exception that the reclaimed fiber waste is composed of 100% homopolymer poly(ethyleneterephthalate). No sodium 3,5-dicarboxybenzenesulfonate is present. The system is now found to be incapable of giving a polymer intrinsic viscosity above about 0.4.

(d) When the temperature of the finisher is raised to 290° C. in I(c) a small increase in intrinsic viscosity of the polymer is observed but the polymeric product is found to have developed enough color so that the yarn produced is no longer of commercial quality.

(e) An attempt to raise the final viscosity of the polymer in I(c) by increasing the antimony catalyst concentration is found to be ineffective.

(f) The ratio of reclaimed monomer to fresh monomer in I(c) is reduced in steps to a final level of 20% reclaimed monomer. The intrinsic viscosity of the polymer produced by this system does not rise to 0.6, the level obtained in I(b), until the concentration of reclaimed monomer reaches the 20% level.

*Example II*

(a) The general procedure of Example I(b) is repeated with the exception that no copolymer containing sodium 3,5-dicarboxybenzenesulfonate is present in the fibrous waste supplied to the system. Instead, the glycol fed to the ester interchange column contains, in addition to the catalyst, sodium 3,5-dicarbomethoxybenzenesulfonate. The sulfonate salt is fed in at a rate of 5.8 pounds per hour to give a concentration of 0.14 mol percent based upon total terephthalic acid content. Operated in this manner, i.e., with the sulfonate salt introduced via the fresh monomer supply, the system is found to give satisfactory performance and a commercially acceptable first-grade fiber product at reclaimed monomer concentrations as high as 45 percent of the total monomer feed.

(b) The general process described in II(a) is operated at a reclaimed monomer feed level of 20%, with and without the addition of sodium 3,5-dicarbomethoxybenzenesulfonate to the feed glycol. All other conditions being equal, it is found that the presence of the sulfonate salt in the polymerization mixture allows the finisher vessel to be operated at twice the pressure required in the absence of the sulfonate salt compound. Thus, even at low concentrations of reclaimed monomer, the process of this invention is advantageous in reducing the strain on the vacuum-producing apparatus attached to the finisher vessel.

While the examples illustrate the invention using 3,5-dicarboxybenzenesulfonate, it is to be understood that any alkali metal or alkaline earth metal salt of an aromatic ester-forming compound falling within the formula given above may be used in the molar range indicated with comparable results.

It will be apparent that many widely different embodiments of this invention may be made without departing from the spirit and scope thereof, and therefore it is not intended to be limted except as indicated in the appended claims.

I claim:

1. The process of reclaiming scrap linear terephthalate polyester which comprises heating the said scrap with a glycol, mixing the resulting diglycol terephthalate ester with a diglycol terephthalate ester prepared from purified starting materials and thereafter polymerizing the mixture under conditions of reduced pressure and elevated temperature in the presence of a minor amount of a metal salt of an aromatic ester-forming compound having the formula

where M is a member of the group consisting of alkali metals and alkaline earth metals; Z is an arylene radical; X is a member of the class consisting of

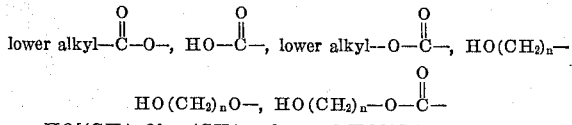

$n$ and $m$ are integers with $n$ being greater than 1; and Y is a member of the class consisting of X and hydrogen.

2. The process of claim 1 in which the metal salt is an alkali metal salt of 3,5-dicarbomethoxybenzenesulfonate.

3. The process of claim 1 in which the metal salt is an alkali metal salt of 2,5-bis(hydroxyethoxy)benzenesulfonate.

4. The process of claim 1 in which the metal salt is an alkali metal salt of 2-carbo-β-hydroxyethoxy-5-hydroxyethoxy-benzenesulfonate.

5. The process of claim 1 in which the concentration of the metal sulfonate salt is from about 0.02 mol percent to 2 mol percent based on the terephthalate ester groups present.

6. The process of claim 5 in which the metal sulfonate salt is present in the amount between about 0.07 mol percent and 0.15 mol percent.

7. The process of claim 1 in which an amount of glycol is added to give a molar ratio of glycol to terephthalate radicals in the range of from about 1.9:1 to 2.1:1.

References Cited by the Examiner
UNITED STATES PATENTS
2,933,476  4/1960  Fisher _____ 260—2.3

FOREIGN PATENTS
610,136  10/1948  Great Britain.
868,496  5/1961  Great Britain.

MURRAY TILLMAN, *Primary Examiner.*
WILLIAM H. SHORT, *Examiner.*